United States Patent
Jung et al.

(10) Patent No.: US 12,294,278 B2
(45) Date of Patent: May 6, 2025

(54) MOTOR

(71) Applicant: LG INNOTEK CO., LTD., Seoul (KR)

(72) Inventors: Hee Chul Jung, Seoul (KR); Chang Hyun Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 453 days.

(21) Appl. No.: 17/912,343

(22) PCT Filed: Mar. 18, 2021

(86) PCT No.: PCT/KR2021/003338
§ 371 (c)(1),
(2) Date: Sep. 16, 2022

(87) PCT Pub. No.: WO2021/187906
PCT Pub. Date: Sep. 23, 2021

(65) Prior Publication Data
US 2023/0125238 A1    Apr. 27, 2023

(30) Foreign Application Priority Data

Mar. 18, 2020  (KR) .......................... 10-2020-0033331
Apr. 21, 2020  (KR) .......................... 10-2020-0048019

(51) Int. Cl.
*H02K 5/22* (2006.01)
*H02K 1/12* (2006.01)

(52) U.S. Cl.
CPC .............. *H02K 5/225* (2013.01); *H02K 1/12* (2013.01)

(58) Field of Classification Search
CPC .............................. H02K 5/225; H02K 1/12
See application file for complete search history.

(56) References Cited

U.S. PATENT DOCUMENTS

| 2009/0127971 A1* | 5/2009 | Ishizeki ................. | H02K 3/522 |
| | | | 310/216.074 |
| 2017/0217301 A1 | 8/2017 | Nagao et al. | |
| 2018/0226847 A1* | 8/2018 | Woo ....................... | H02K 7/085 |
| 2019/0372424 A1* | 12/2019 | Ryu ......................... | H02K 3/50 |

FOREIGN PATENT DOCUMENTS

| CN | 116982239 | * | 4/2024 | ............ H02K 1/185 |
| KR | 20-1999-0039148 U | | 11/1999 | |
| KR | 10-2013-0010988 A | | 1/2013 | |
| KR | 10-2016-0081134 A | | 7/2016 | |
| KR | 10-2017-0008090 A | | 1/2017 | |
| KR | 10-2017-0034554 A | | 3/2017 | |

\* cited by examiner

*Primary Examiner* — Terrance L Kenerly
(74) *Attorney, Agent, or Firm* — Birch, Stewart, Kolasch & Birch, LLP

(57) ABSTRACT

The present invention can provide a motor including a housing, a stator disposed in the housing, a rotor disposed inside the stator, and a shaft coupled to the rotor, wherein the stator includes a stator core in contact with the housing, the stator core includes a first region and a second region having different outer diameters, the housing includes a third region and a fourth region having different inner diameters, the outer diameter of the first region is smaller than the outer diameter of the second region, the inner diameter of the third region is greater than the inner diameter of the fourth region, and the first region and the third region are disposed to overlap in a radial direction of the shaft.

10 Claims, 23 Drawing Sheets

[FIG. 1]
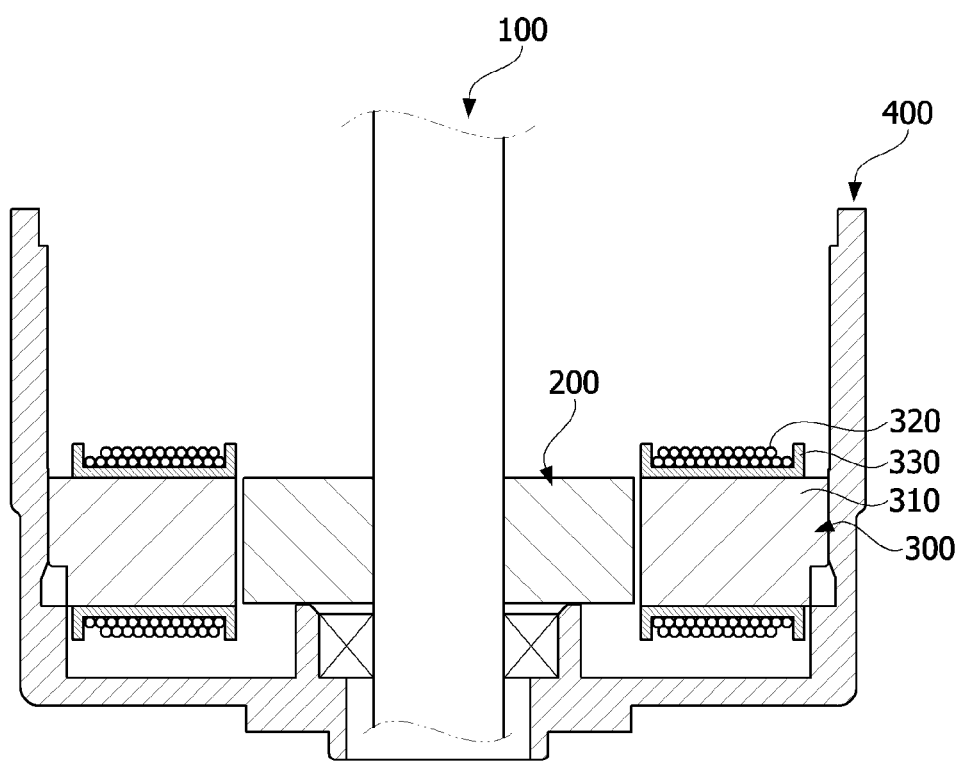

[FIG. 2]
310
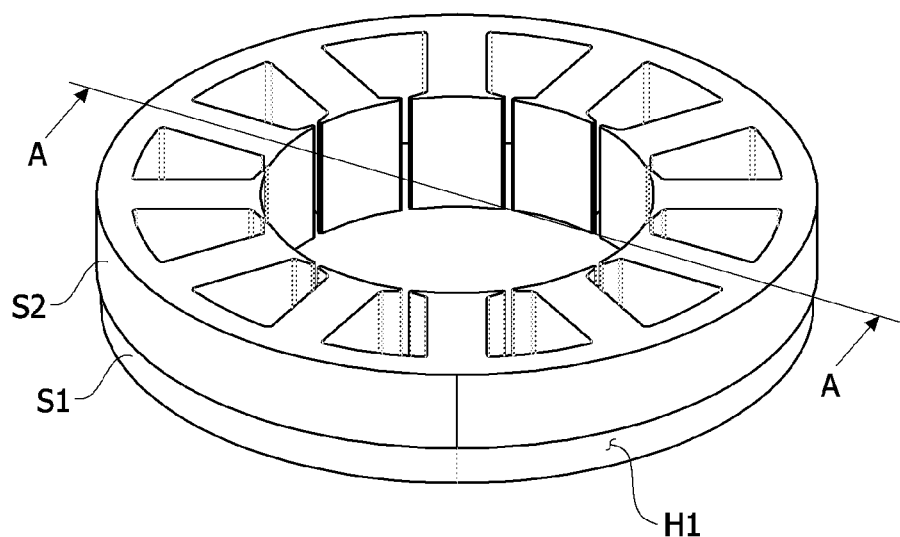

[FIG. 3]
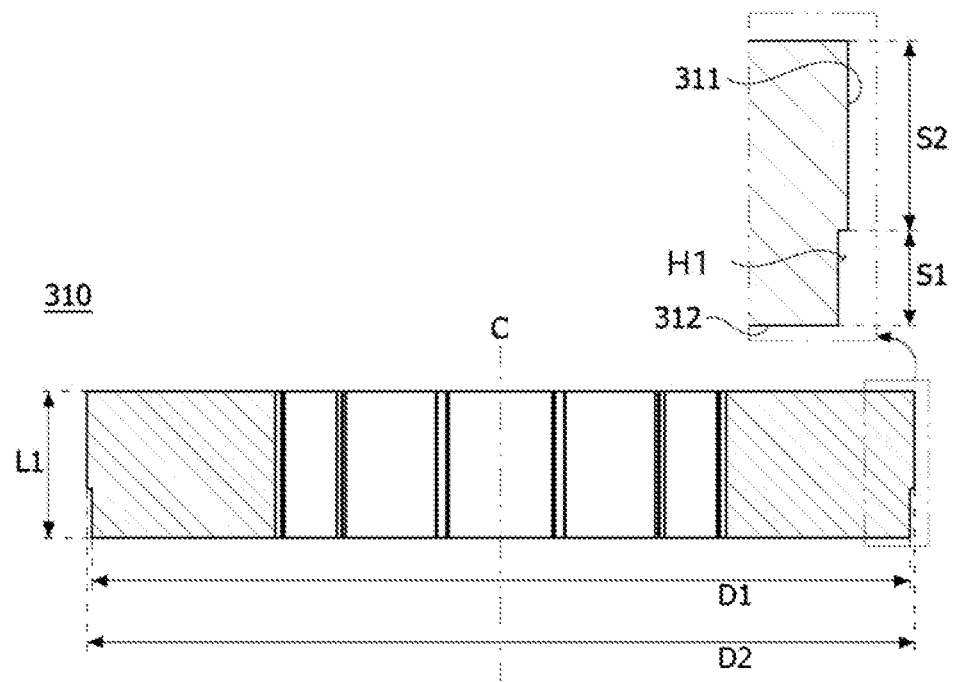

[FIG. 4]
400
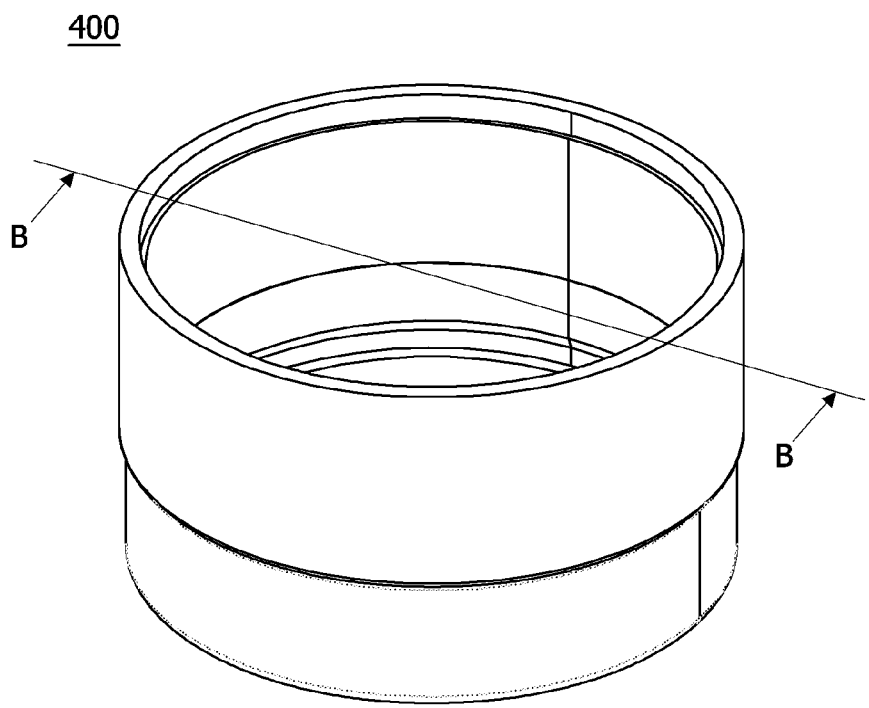

[FIG. 5]
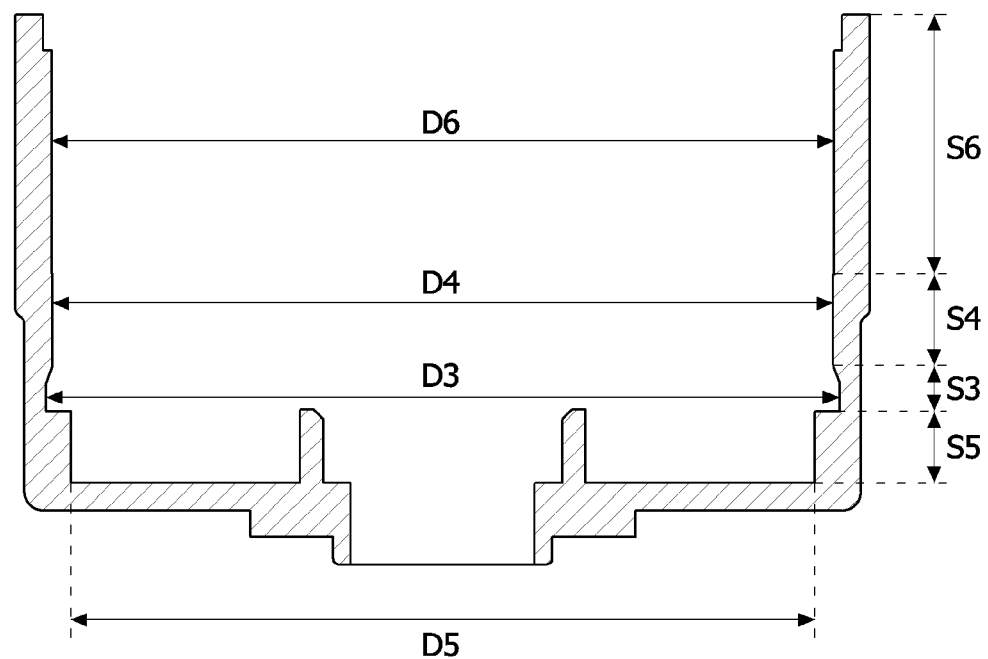

[FIG. 6]
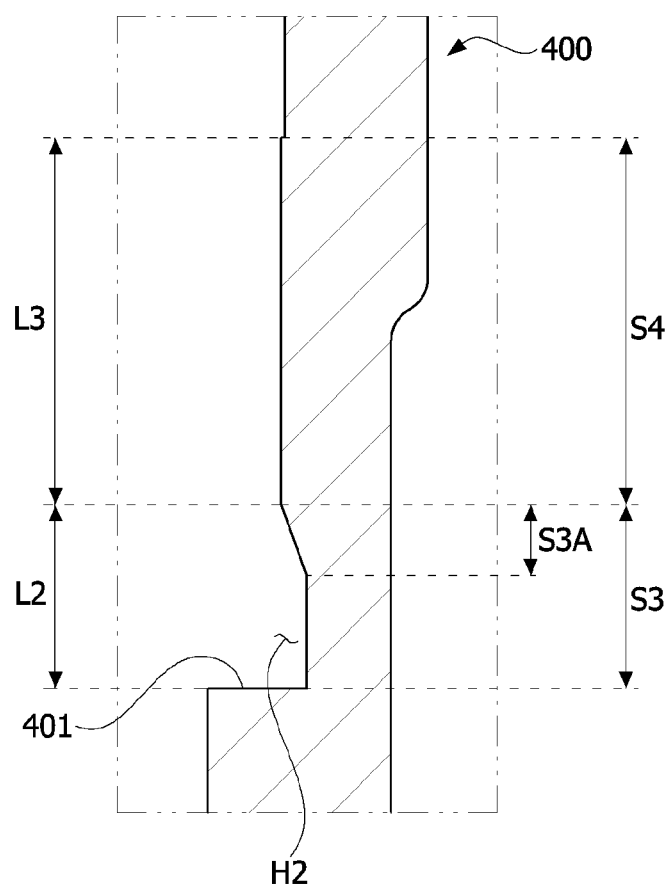

[FIG. 7]
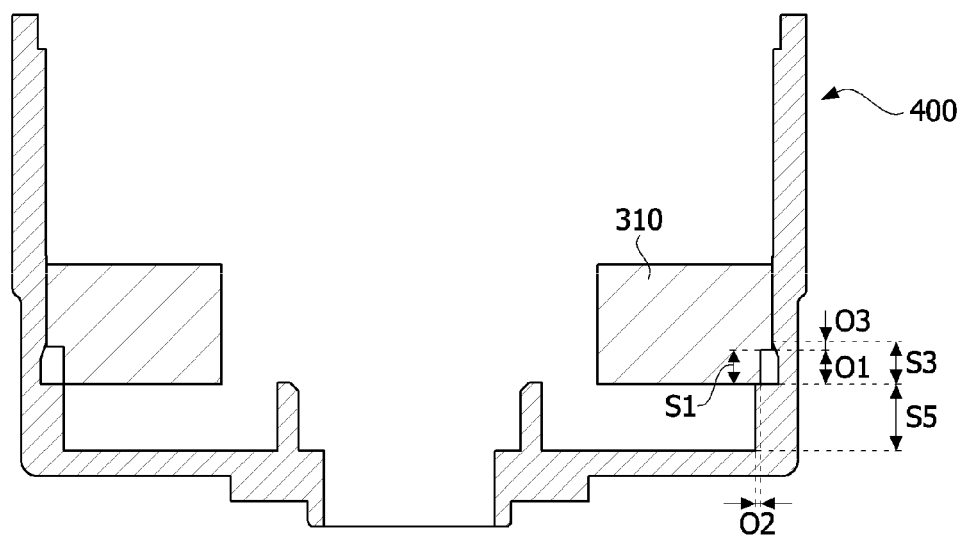

[FIG. 8]
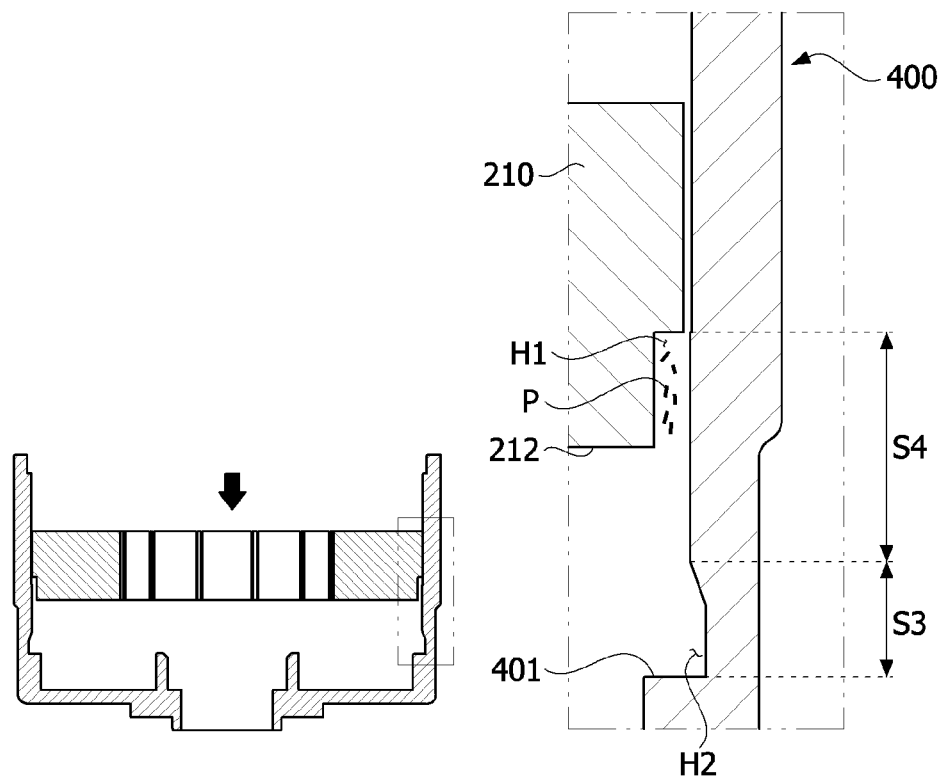

[FIG. 9]
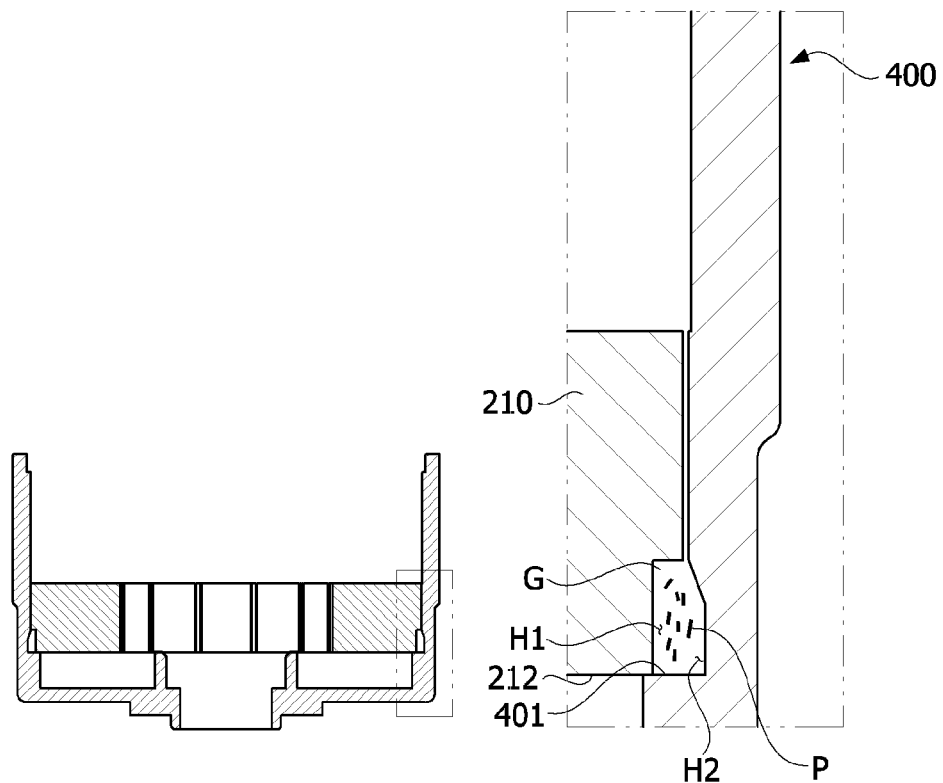

[FIG. 10]
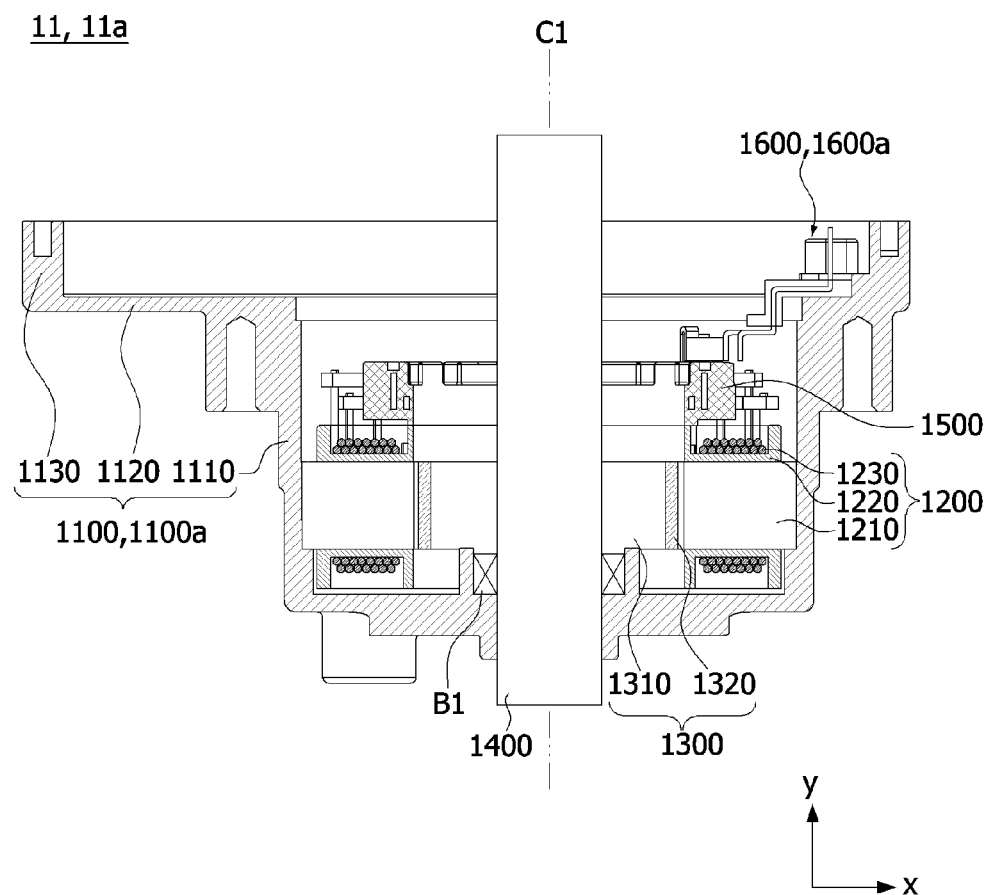

[FIG. 11]
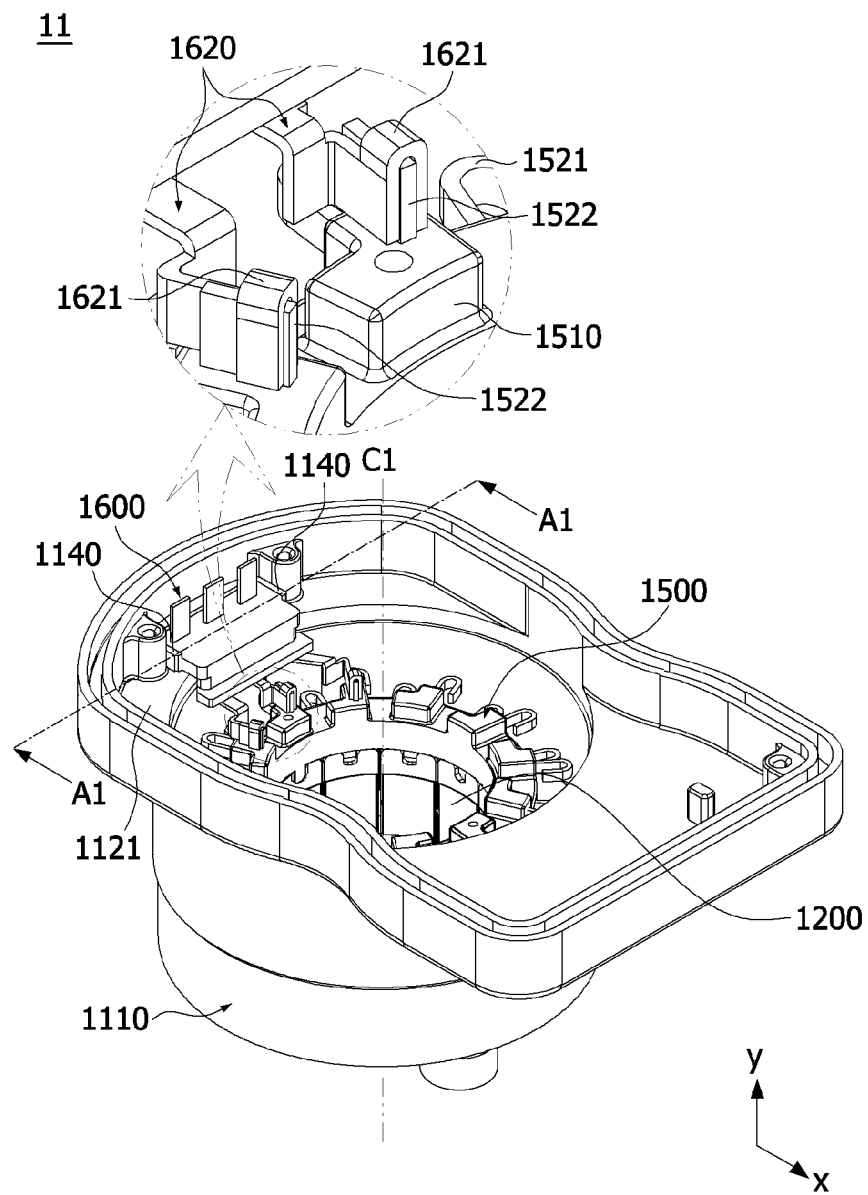

[FIG. 12]
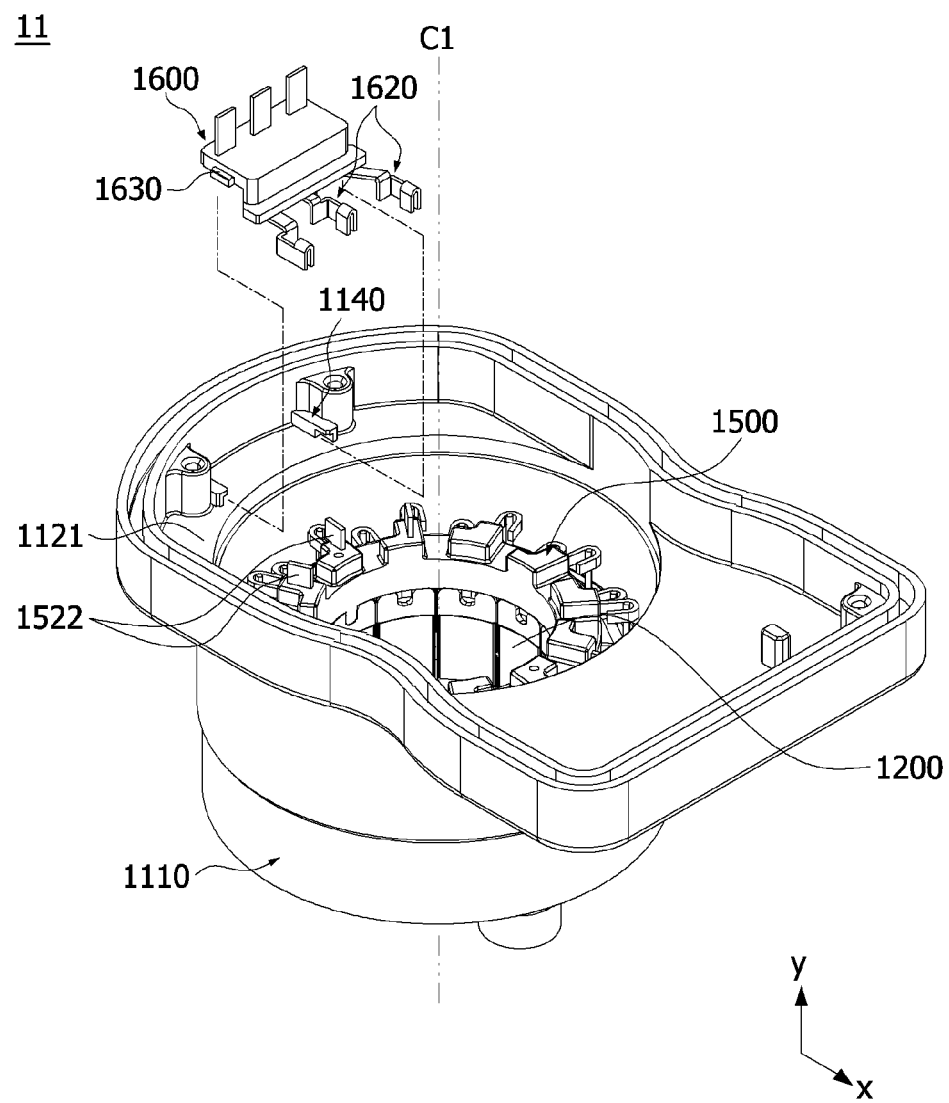

[FIG. 13]
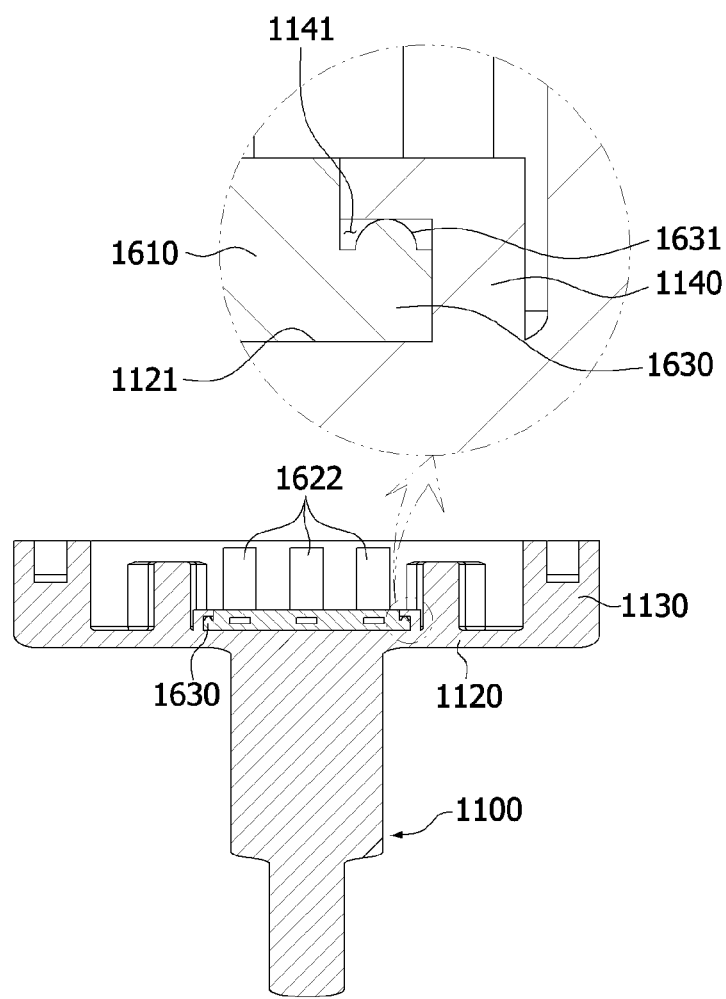

[FIG. 14]
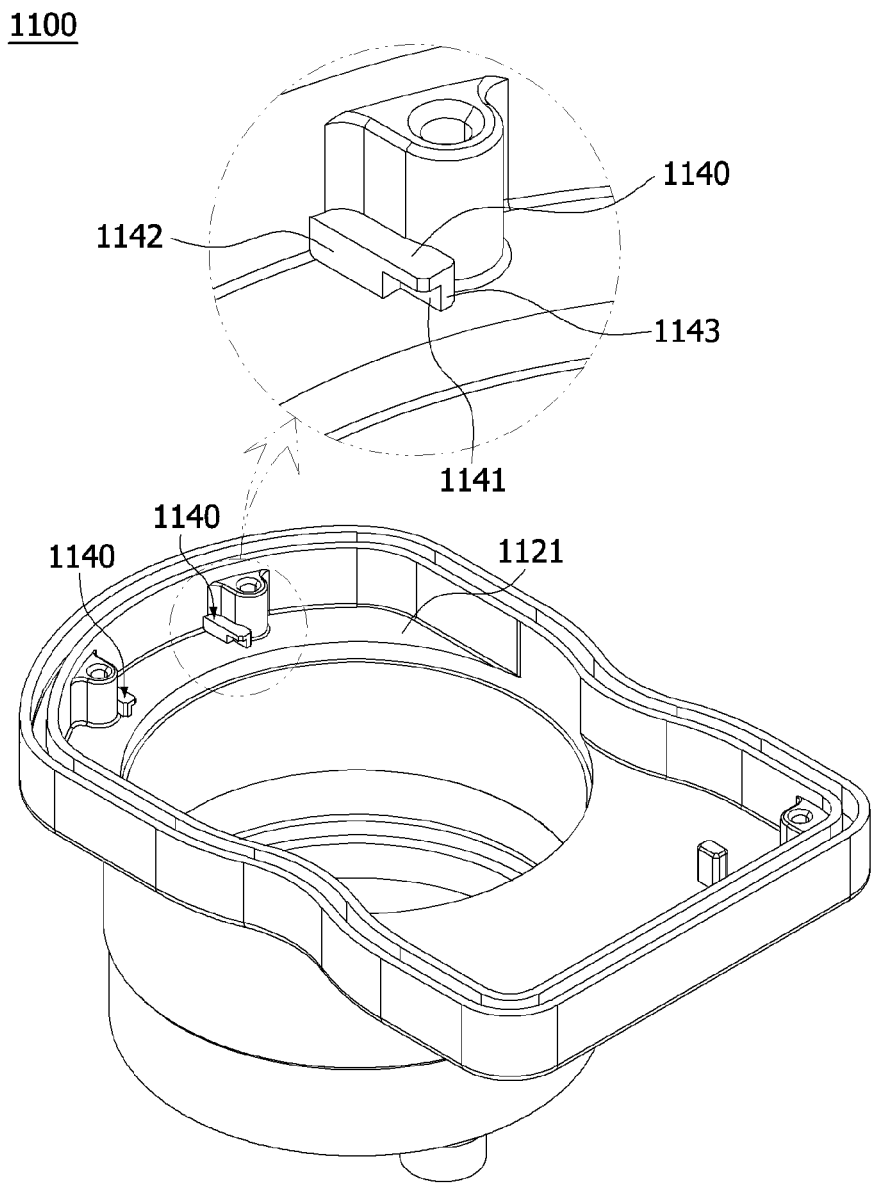

[FIG. 15]
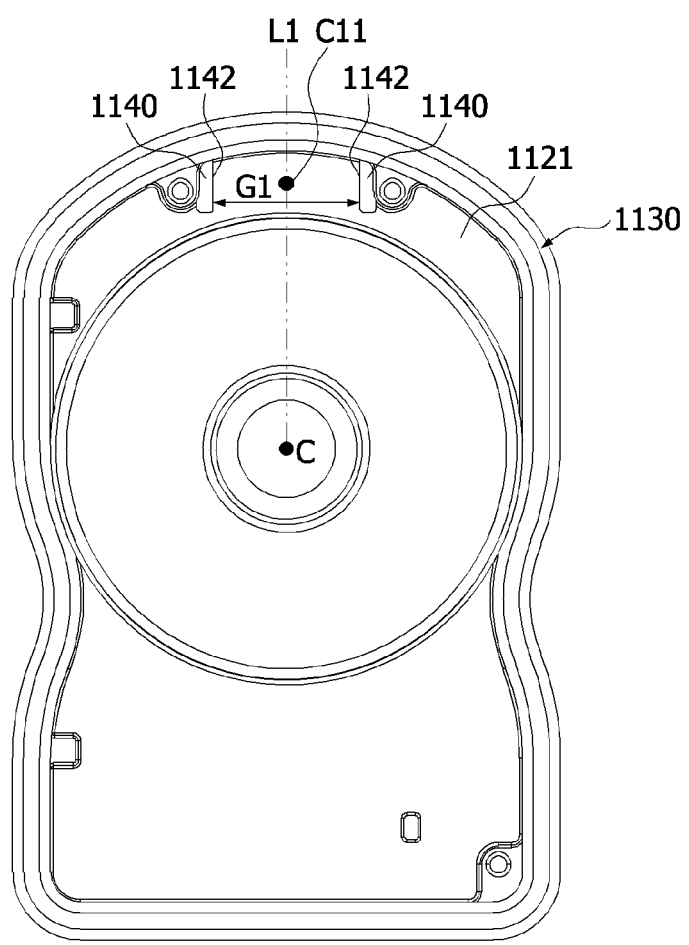

[FIG. 16]
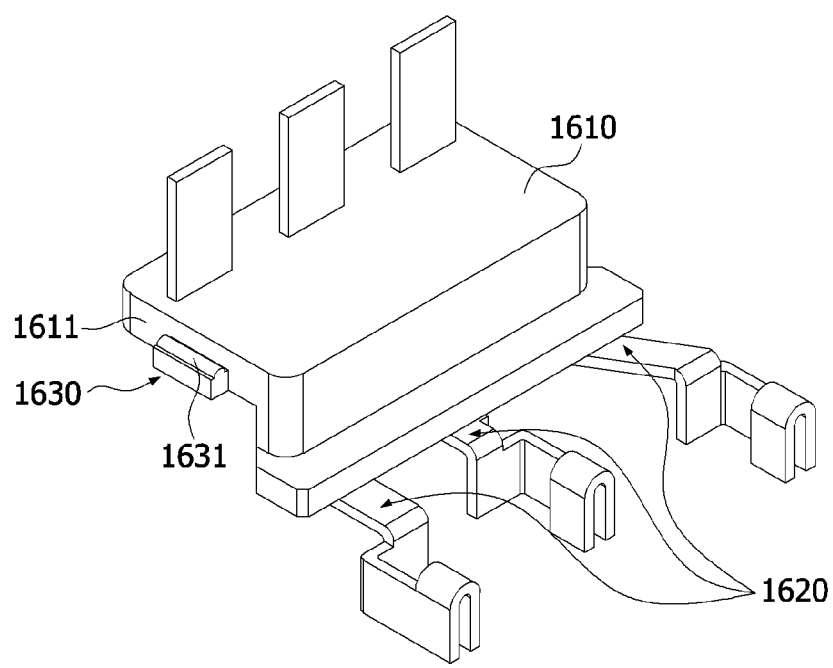

[FIG. 17]
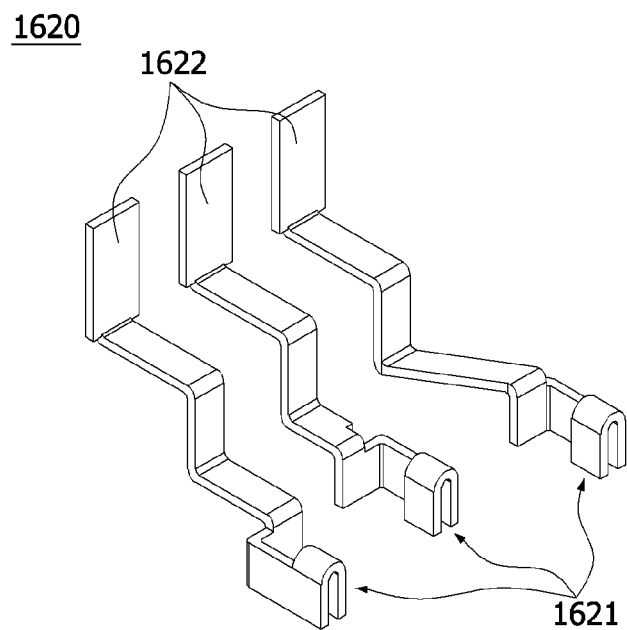

[FIG. 18]
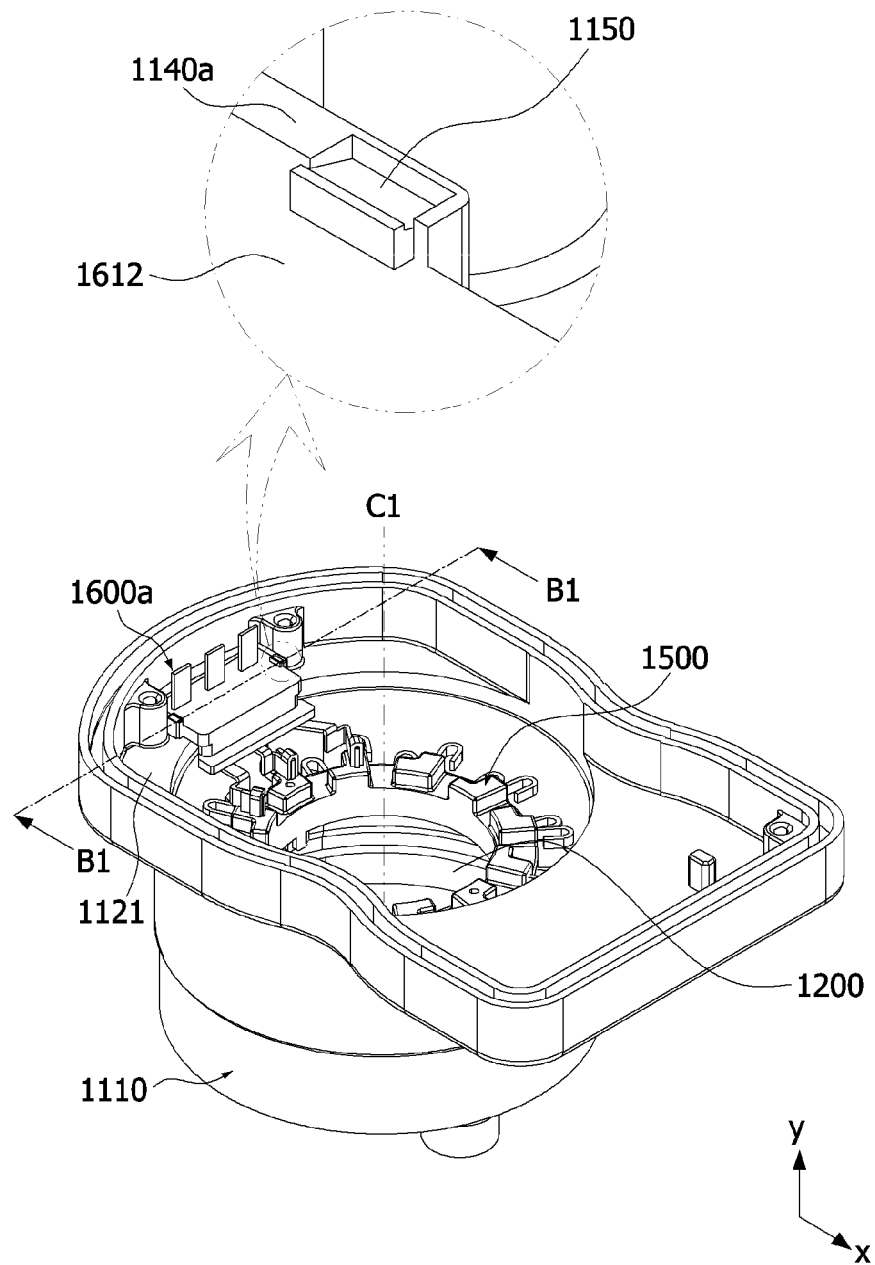

[FIG. 19]
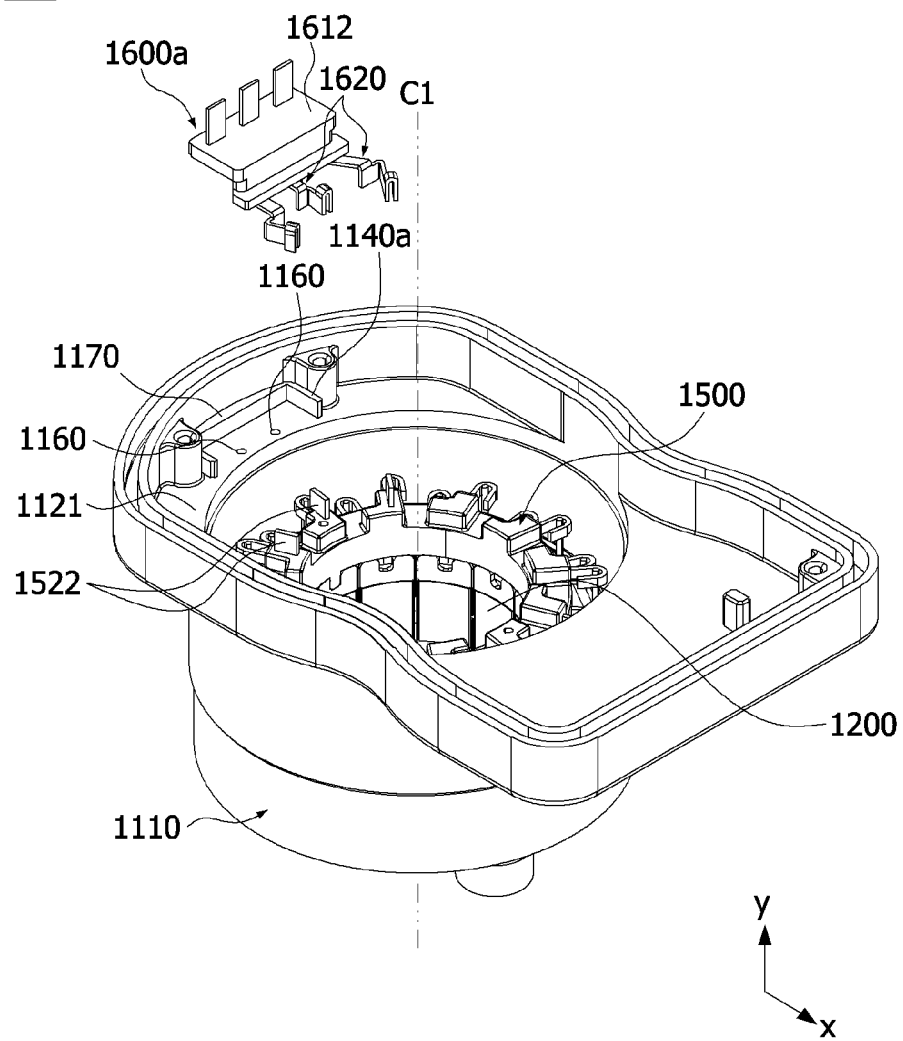

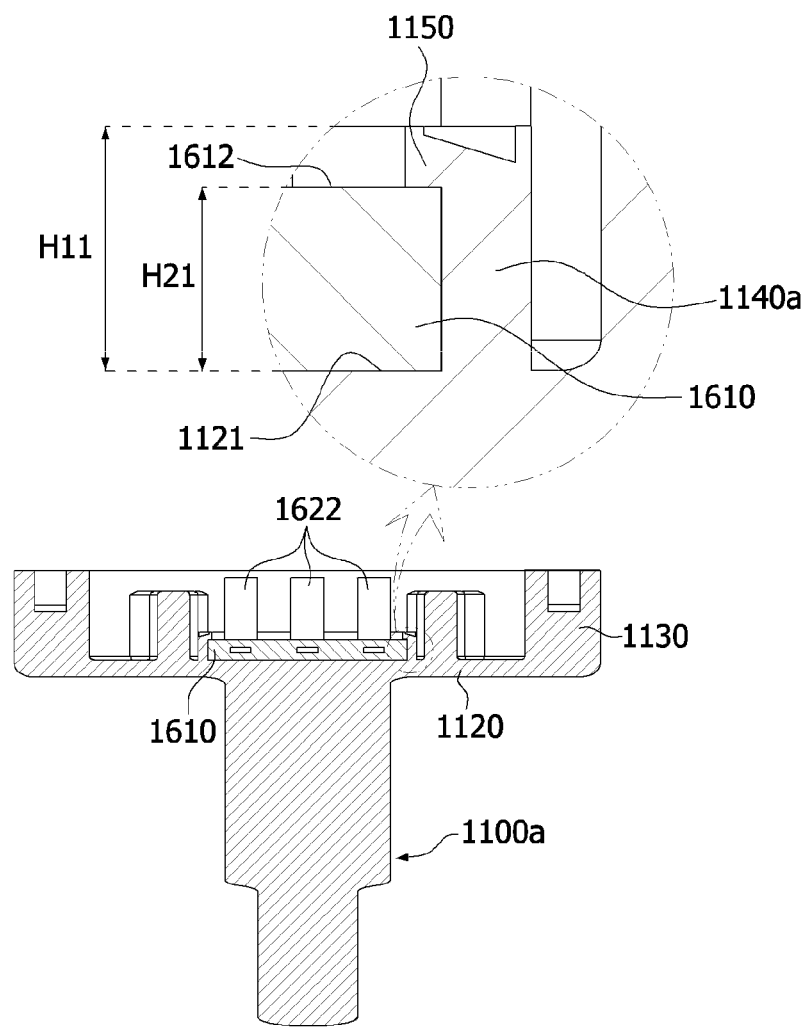
[FIG. 20]

[FIG. 21]
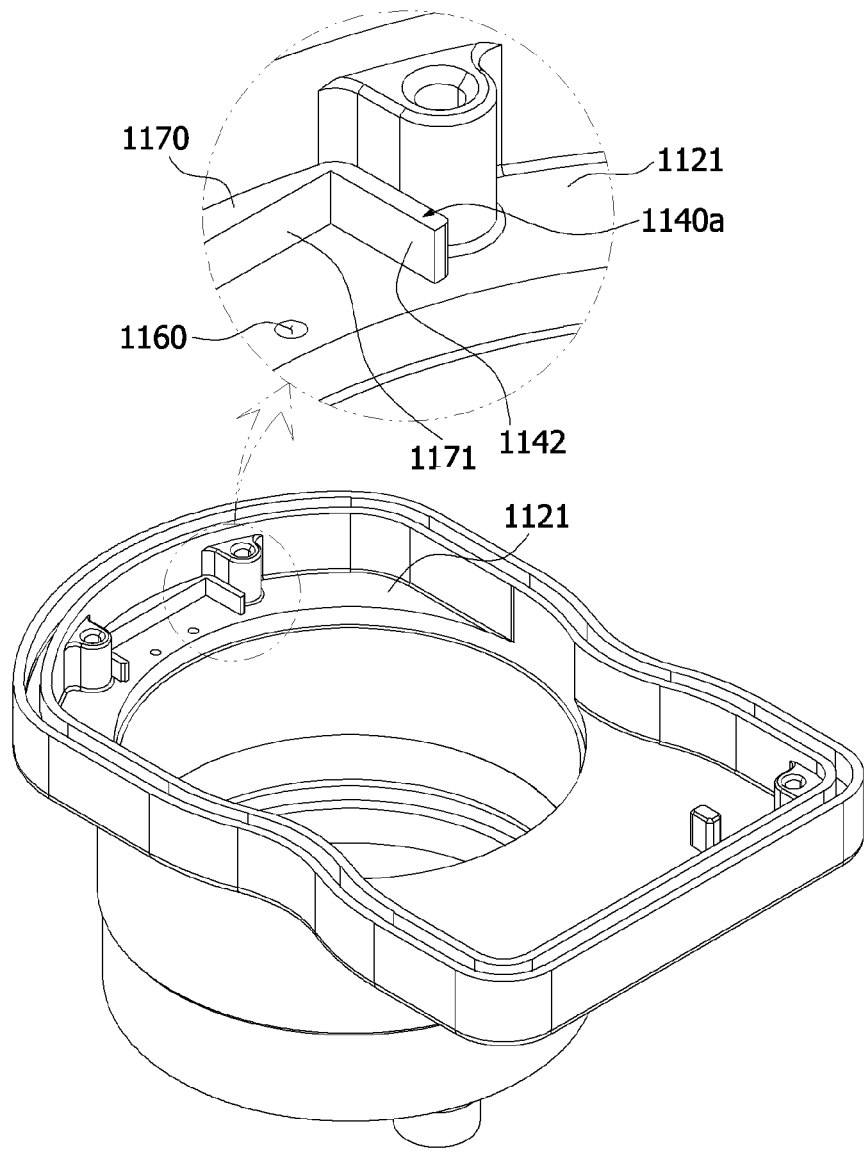

[FIG. 22]
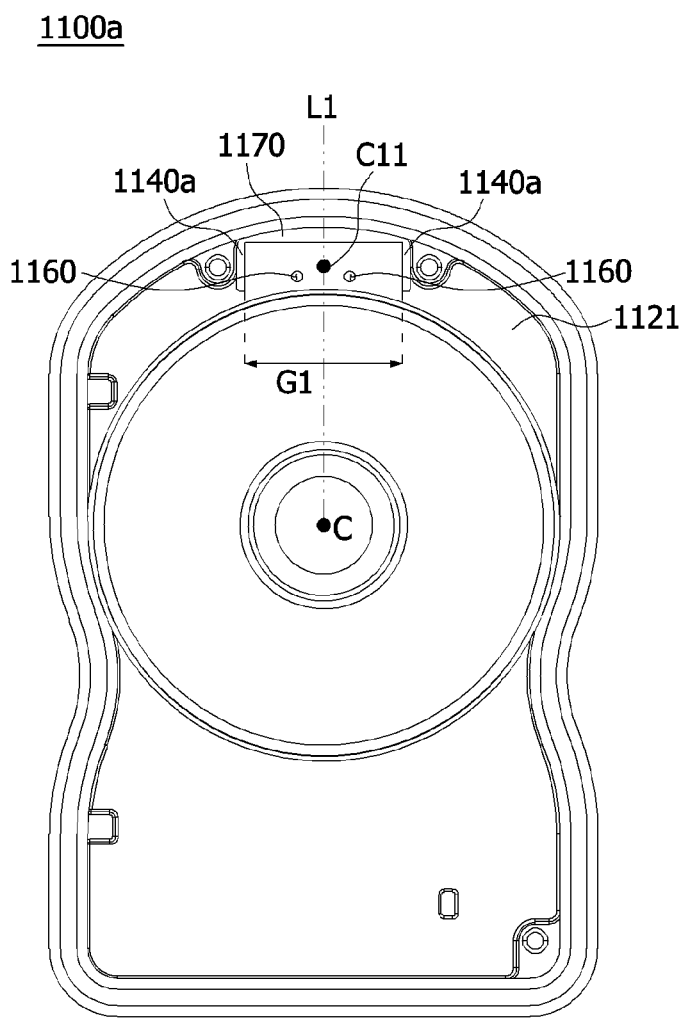

[FIG. 23]
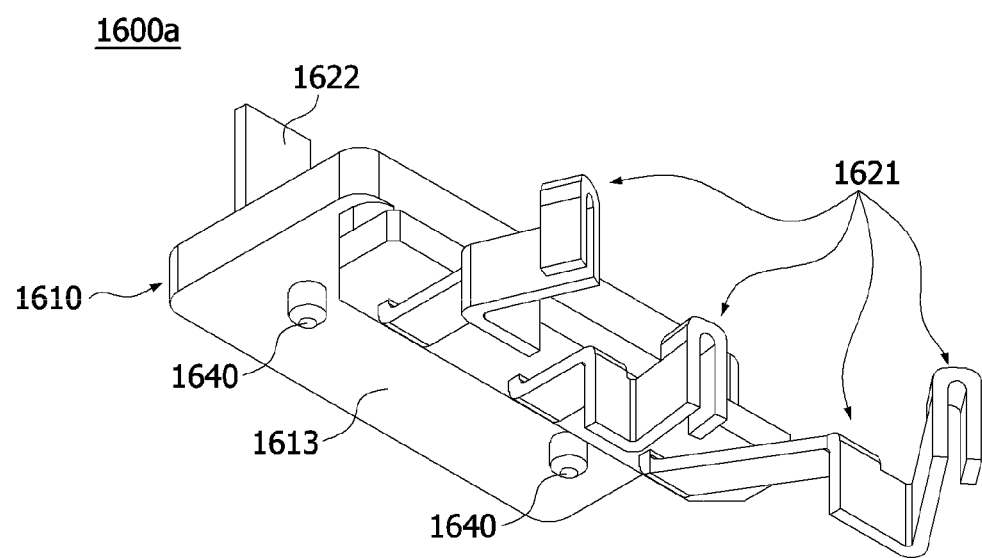

MOTOR

CROSS REFERENCE TO RELATED APPLICATIONS

This application is the National Phase of PCT International Application No. PCT/KR2021/003338, filed on Mar. 18, 2021, which claims priority under 35 U.S.C. 119(a) to Patent Application Nos. 10-2020-0033331, filed in the Republic of Korea on Mar. 18, 2020 and 10-2020-0048019, filed in the Republic of Korea on Apr. 21, 2020, all of which are hereby expressly incorporated by reference into the present application.

TECHNICAL FIELD

The present invention relates to a motor.

BACKGROUND ART

A motor includes a shaft, a rotor, and a stator. The rotor and the stator are accommodated in a housing. The stator may include a stator core and a coil wound around the stator core.

The stator core is press-fitted into the housing. In this case, the housing is heated to increase an inner diameter of the housing, and then the stator core is press-fitted into the housing. However, this method has problems of a difficulty in managing heating conditions and a large increase in total manufacturing time of the motor. Particularly, since an apparatus for heating the housing is required separately, there is a problem of an increase in cost.

In addition, since the housing is heated, dimensions or a shape of the housing are changed, and thus a severe problem of assemblability with other components installed in the housing may occur.

In order to solve such problems, the stator core may be press-fitted into the housing without heating the housing. However, chips are generated in this process due to a difference in hardness between a housing generally formed of an aluminum material and a stator core formed of a steel material. Such materials may cause a severe problem when a motor operates while the housing and the stator core are in contact with a stator or rotor in the motor.

In addition, a motor may include a busbar electrically connected to a coil of a stator and a power terminal assembly disposed to apply power to a terminal of the busbar. In this case, the stator induces an electrical interaction with a rotor to induce the rotation of the rotor.

In this case, the power terminal assembly may be fixed to a housing using a fastening member such as a bolt. Accordingly, in order for fixing through the fastening member, a separate process is required for the housing and the power terminal assembly.

Accordingly, the conventional motor has a problem of a decrease in productivity due to an increase in manufacturing costs and an increase in the number of assembly processes due to the fastening member.

Accordingly, a motor in which a process for a housing and a power terminal assembly is simplified is required.

DISCLOSURE

Technical Problem

The present invention is directed to providing a motor in which chips are not generated even when a stator core is press-fitted into the housing without heating a housing.

In addition, the present invention is directed to providing a motor in which separation and movement of a power terminal is prevented using a coupling structure between a housing and a power terminal assembly without using a separate fastening member.

Technical Solution

One aspect of the present invention provides a motor including a housing, a stator disposed in the housing, a rotor disposed inside the stator, and a shaft coupled to the rotor, wherein the stator includes a stator core in contact with the housing, the stator core includes a first region and a second region having different outer diameters, the housing includes a third region and a fourth region having different inner diameters, the outer diameter of the first region is smaller than the outer diameter of the second region, the inner diameter of the third region is greater than the inner diameter of the fourth region, and the first region and the third region are disposed to overlap in a radial direction of the shaft.

The housing may further include a fifth region, an inner diameter of the fifth region may be smaller than the inner diameter of the fourth region, and the third region may be disposed between the fourth region and the fifth region in an axial direction.

The first region may be disposed to overlap the fifth region in the axial direction of the shaft.

The third region may include a 3-1 region of which an inner diameter increases, and the 3-1 region may be connected to the fourth region.

A part of the 3-1 region may be disposed to overlap the second region in the radial direction.

The housing may include a sixth region disposed at one side of the fourth region, an inner diameter of the sixth region may be greater than the inner diameter of the fourth region, and a length the stator core in the axial direction may be greater than a length of the third region in the axial direction and smaller than a sum of the length of the third region in the axial direction and a length of the fourth region in the axial direction.

Another aspect of the present invention provides a motor including a housing, a stator disposed in the housing, a rotor disposed inside the stator, and a shaft coupled to the rotor, wherein the stator includes a stator core and coils wound around the stator core, the stator core includes a first groove formed in an outer surface in a concave shape, the housing includes a second groove formed in an inner surface in a concave shape, and the first groove and the second groove are disposed to overlap in a radial direction.

The first groove may be disposed in a circumferential direction of the stator core to form an annular shape, and the second groove may be disposed in a circumferential direction of the housing to form an annular shape.

The first groove may be disposed at a boundary between the outer surface and a bottom surface of the stator core, the housing may include a step protruding inward from the inner surface of the housing and connected to the second groove, and the bottom surface of the stator core may be in contact with the step.

A length of the second groove in an axial direction may be greater than a length of the first groove in the axial direction, and the first groove and the second groove may form a closed space having an annular shape between the stator and the housing.

Still another aspect of the present invention provides a motor including a housing, a stator disposed in the housing, a rotor disposed to correspond to the stator, a shaft coupled to the rotor, a busbar disposed on the stator, and a power terminal assembly coupled to the housing, wherein the housing includes a first region in which an opening is formed in an upper portion and the stator and the rotor are disposed, a second region extending from an end portion of the first region in a radial direction, a third region extending from an outer end portion of the second region in an axial direction, and a pair of first protrusions formed on the second region to protrude in the axial direction, and the power terminal assembly is guided by the first protrusions and disposed between the first protrusions.

The housing may include first grooves formed in the first protrusions, the power terminal assembly may include a body, a plurality of power terminals disposed in the body, and first protruding parts formed to protrude from the body, the body and the first protruding parts may be integrally formed, and the first protruding parts may be coupled to the first grooves.

The first grooves may be concavely formed in inner surfaces of the first protrusions, and the first protruding parts may be slide-coupled to the first grooves.

An upper surface of the first protruding part may be a curved surface.

Based on a virtual line connecting a center of the shaft and a center between the pair of first protrusions, one surfaces of the first protrusions disposed to face each other may be disposed parallel to the line.

One region of the each of first protrusions may be disposed to overlap the first protruding part in the axial direction.

The power terminal assembly may include the body and the plurality of power terminals disposed in the body, and based on an upper surface of the second region, a height of the first protrusion may be greater than a height of the body.

The housing may further include a caulking part, which is formed by caulking one region of the first protrusion and is in contact with an upper surface of the body.

The power terminal assembly may further include a second protruding part formed to protrude from a lower surface of the body, and the second protruding part may be coupled to a second groove formed in an upper surface of the housing in the axial direction.

An end portion of the power terminal may be coupled to a busbar terminal of the busbar in a fusing manner.

The housing and the body of the power terminal assembly may be formed of different materials.

Yet another aspect of the present invention provides a motor including a housing, a stator disposed in the housing, a rotor disposed to correspond to the stator, a shaft coupled to the rotor, a busbar disposed on the stator, and a power terminal assembly coupled to the housing, wherein the housing includes a first region in which an opening is formed in an upper portion and the stator and the rotor are disposed, a second region extending from an end portion of the first region in a radial direction, and a pair of first protrusions formed in the second region to protrude in an axial direction, the power terminal assembly includes a body, a plurality of power terminals disposed in the body, and first protruding parts formed to protrude from the body, and the first protruding parts are slide-coupled to first grooves concavely formed in the first protrusions.

Yet another aspect of the present invention provides a motor including a housing, a stator disposed in the housing, a rotor disposed to correspond to the stator, a shaft coupled to the rotor, a busbar disposed on the stator, and a power terminal assembly coupled to the housing, wherein the housing includes a first region in which an opening is formed in an upper portion and the stator and the rotor are disposed, a second region extending from an end portion of the first region in a radial direction, and a pair of first protrusions formed in the second region to protrude in an axial direction, the power terminal assembly includes a body and a plurality of power terminals disposed in the body, and the housing further includes a caulking part, which is formed by caulking one region of each of the first protrusions and is in contact with an upper surface of the body.

Advantageous Effects

According to embodiments, there is an advantage that a stator core can be press-fitted into the housing at room temperature without heating a housing.

According to the embodiments, there is an advantage that chips generated in a process in which the stator core is press-fitted into the housing are prevented from being introduced into a motor.

According to the embodiments, separation and movement of a power terminal can be prevented by implementing a coupling structure between the housing and a power terminal assembly without using a separate fastening member.

In addition, a fixing force of the power terminal assembly can be further increased through coupling by fusing a terminal of the power terminal assembly and a busbar terminal. For example, the fixedness of the power terminal assembly can be further improved through coupling between the housing and the power terminal assembly and coupling between the power terminal assembly and a busbar. In this case, the busbar can be fixed to an upper side of the stator through coupling with a coil of the stator.

DESCRIPTION OF DRAWINGS

FIG. 1 is a view illustrating a motor according to an embodiment.

FIG. 2 is a perspective view illustrating a stator core.

FIG. 3 is a cross-sectional view illustrating the stator core along line A-A of FIG. 2.

FIG. 4 is a perspective view illustrating a housing.

FIG. 5 is a cross-sectional view illustrating the housing along line B-B of FIG. 4.

FIG. 6 is an enlarged view illustrating a third region and a fourth region of the housing.

FIG. 7 is a cross-sectional view illustrating the stator core and the housing forming a space for accommodating chips.

FIG. 8 is a side view illustrating a process in which the stator core is press-fitted into the housing.

FIG. 9 is a side view illustrating a state in which the stator core is press-fitted into the housing of FIG. 8.

FIG. 10 is a view illustrating a motor according to another embodiment.

FIG. 11 is a perspective view illustrating the motor illustrated in FIG. 10.

FIG. 12 is an exploded perspective view illustrating the motor illustrated in FIG. 10.

FIG. 13 is a cross-sectional view along line A-A of FIG. 11.

FIG. 14 is a perspective view illustrating a housing of the motor illustrated in FIG. 10.

FIG. 15 is a plan view illustrating the housing of the motor illustrated in FIG. 10.

FIG. 16 is a view illustrating a power terminal assembly of the motor illustrated in FIG. 10.

FIG. 17 is a view illustrating power terminals of the power terminal assembly disposed in the motor illustrated in FIG. 10.

FIG. 18 is a perspective view illustrating a motor according to still another embodiment.

FIG. 19 is an exploded perspective view illustrating the motor illustrated in FIG. 18.

FIG. 20 is a cross-sectional view along line B-B of FIG. 18.

FIG. 21 is a perspective view illustrating a housing of the motor illustrated in FIG. 18.

FIG. 22 is a plan view illustrating the housing of the motor illustrated in FIG. 18.

FIG. 23 is a view illustrating a power terminal assembly of the motor illustrated in FIG. 18.

MODES OF THE INVENTION

A direction parallel to a longitudinal direction (vertical direction) of a shaft is referred to as an axial direction, a direction perpendicular to the axial direction based on the shaft is referred to as a radial direction, and a direction along a circumference of a circle having a radius based on the shaft is referred to as a circumferential direction.

FIG. 1 is a view illustrating a motor according to an embodiment.

Referring to FIG. 1, the motor according to the embodiment may include a shaft 100, a rotor 200, and a stator 300. Hereinafter, the term "inward" refers to a direction from a housing 400 toward the shaft 100 which is a center of the motor, and the term "outward" refers to a direction opposite to "inward," that is, a direction from the shaft 100 toward the housing 400.

The shaft 100 may be coupled to the rotor 200. When an electromagnetic interaction occurs between the rotor 200 and the stator 300 when a current is supplied, the rotor 200 rotates, and the shaft 100 rotates in conjunction with the rotation of the rotor 200.

The rotor 200 rotates due to an electrical interaction with the stator 300. The rotor 200 may be disposed inside the stator 300.

The stator 300 is disposed outside the rotor 200. The stator 300 may include a stator core 310, an insulator 320 installed on the stator core 310, and coils 330. The coils 330 may be wound around the insulator 320. The insulator 320 is disposed between the coils 330 and the stator core 310 to serve to electrically insulate the stator core 310 from the coils 330. The coils 330 induce an electrical interaction with magnets of the rotor 200.

The housing 400 may be disposed outside the stator 300. An inner circumferential surface of the housing 400 may be in contact with an outer circumferential surface of the stator core 310.

In a state of room temperature at which the housing 400 is not heated, the stator core 310 is press-fitted into the housing 400. Accordingly, a process and an apparatus for heating the housing 400 are not required when the motor according to the embodiment is manufactured.

FIG. 2 is a perspective view illustrating the stator core 310, and FIG. 3 is a cross-sectional view illustrating the stator core 310 along line A-A of FIG. 2.

Referring to FIGS. 2 and 3, the stator core 310 may include a first region S1 and a second region S2. The first region S1 and the second region S2 are regions for accommodating chips generated in a process of press-fitting the stator core 310 into the housing 400, are divided and disposed in an axial direction, and have different outer diameters. An outer diameter D1 of the first region S1 is smaller than an outer diameter D2 of the second region S2.

With respect to the second region S2, a space formed by the first region S1 concavely disposed in a radial direction corresponds to a first groove H1. The first groove H1 may be positioned at a boundary between an outer surface 311 and a bottom surface 312 of the stator core 310. With a second groove H2 disposed in the housing 400, the first groove H1 is a space for accommodating the chips generated in the process of press-fitting the stator core 310 into the housing 400.

FIG. 4 is a perspective view illustrating the housing 400, FIG. 5 is a cross-sectional view illustrating the housing 400 along line B-B of FIG. 4, and FIG. 6 is an enlarged view illustrating a third region and a fourth region of the housing 400.

Referring to FIGS. 4 to 6, the housing 400 may include a third region S3, a fourth region S4, a fifth region S5, and a sixth region S6. An inner surface of the housing 400 is divided into the third region S3, the fourth region S4, the fifth region S5, and the sixth region S6 in the axial direction. Inner diameters of the third region S3, the fourth region S4, the fifth region S5, and the sixth region S6 may be different from each other. Hereinafter, when a direction in which the stator core 310 is press-fitted is referred to as an upward direction, and a direction opposite to the upward direction is referred to as a downward direction. The sixth region S6, the fourth region S4, the third region S3, and the fifth region S5 may be sequentially disposed from an upper side toward a lower side.

The third region S3 is a region for accommodating the chips generated in the process of press-fitting the stator core 310 into the housing 400, is divided and disposed in the axial direction, and has the inner diameter different from those of the others. An inner diameter D3 of the third region S3 is greater than an inner diameter D4 of the fourth region S4. The third region S3 may be disposed under the fourth region S4.

The fourth region S4 is disposed above the third region S3. The inner diameter D4 of the fourth region S4 is smaller than the inner diameter D3 of the third region S3. The fourth region S4 is a region in contact with an outer circumferential surface of the second region S2 of the stator core 310 when the stator core 310 is press-fitted into the housing 400 in the axial direction, and a part of a surface of the fourth region S4 may be cut in the process of the press-fitting to generate the chips.

The fifth region S5 may be disposed under the third region S3. An inner diameter D5 of the fifth region S5 is smaller than the inner diameter D3 of the third region S3, the inner diameter D4 of the fourth region S4, and an inner diameter D6 of the sixth region S6. Accordingly, the fifth region S5 and the third region S3 form a step 401. The step 401 is in contact with the bottom surface 312 of the stator core 310 to support the stator core 310 in the axial direction and determine a position of the stator core 310 in the axial direction.

The sixth region S6 may be disposed above the fourth region S4. The sixth region S6 is a region at which the stator core 310 starts to enter when the stator core 310 is press-fitted into the housing 400 in the axial direction. The inner surface of the housing 400 may be defined based on the sixth region S6. Although the inner diameter D6 of the sixth region S6 may be set to be equal to the inner diameter D4 of the fourth region S4, in consideration of reducing a press-fitting section of the stator core 310 and a tolerance of the stator core 310 with respect to the outer circumferential surface of the second region S2, the inner diameter D6 of the sixth region S6 may also be set to be slightly greater than the inner diameter D4 of the fourth region S4.

Meanwhile, the third region S3 may include a 3-1 region S3A of which an inner diameter increases from an upper side toward a lower side. The 3-1 region S3A is disposed to be connected to the fourth region S4 and serves to guide the chips generated when the stator core 310 moves downward while cutting the surface of the fourth region S4 to be introduced into an accommodation space formed due to the first groove H1 and the second groove H2.

Referring to FIGS. 3 and 6, a length L1 of the stator core 310 in the axial direction may be greater than a length L2 of the third region S3 in the axial direction and smaller than the sum of the length L1 of the third region S3 in the axial direction and a length L3 of the fourth region S4 in the axial direction. This is a structure for forming a closed space G (see FIG. 9) in consideration of a contact area between the stator core 310 and the housing 400 and a position of the step 401.

FIG. 7 is a cross-sectional view illustrating the stator core 310 and the housing 400 forming a space for accommodating the chips.

Referring to FIG. 7, the first region S1 of the stator core 310 and the third region S3 of the housing 400 are disposed to form an overlap region O1 in the radial direction. In this case, a part of the 3-1 region S3A of the housing 400 may be disposed to form the overlap region O1 with the second region S2 of the stator core 310. In addition, the first region S1 of the stator core 310 and the fifth region S5 of the housing 400 may form the overlap region O1 in the axial direction. This is to form the closed space G (see FIG. 9) which accommodates the chips generated in the process of press-fitting the stator core 310. Such a space may be the annular closed space G (see FIG. 9) formed in a circumferential direction.

FIG. 8 is a side view illustrating the process in which the stator core 310 is press-fitted into the housing 400.

Referring to FIG. 8, when the stator core 310 starts to be press-fitted in the axial direction, the chips are generated while a part of an inner surface of the fourth region S4 is cut by the stator core 310. The chips are accommodated in the first groove H1 and move downward with the stator core 310 while the stator core 310 is press-fitted. In the process of press-fitting the stator core 310, since the chips are primarily accommodated in the first groove H1, there is an advantage that the chips are not scattered into the motor. The stator core 310 may move downward until the bottom surface 312 is hooked on the step 401.

FIG. 9 is a side view illustrating a state in which the stator core 310 is press-fitted into the housing 400 of FIG. 8.

Referring to FIG. 9, when the bottom surface 312 of the stator core 310 is in contact with the step 401, the first groove H1 and the second groove H2 form the closed space G. The chips primarily accommodated in the first groove H1 in the process of press-fitting the stator core 310 are accommodated in the closed space G. Since the bottom surface 312 of the stator core 310 is in contact with the step 401, the closed space G is a space completely separated from an inner portion of the motor. Accordingly, a state in which the chips generated in the process of press-fitting the stator core 310 are accommodated in the closed space G may be maintained not only in an assembly process of the motor but also after the assembly is completed.

When an oil with high viscosity is applied on the inner surface of the housing 400, specifically, on the fourth region S4, the oil is applied on the chips generated while the surface of the fourth region S4 is cut, and thus the chips can be accommodated in the closed space G without being scattered.

Since the closed space G is formed due to not only the second groove H2 but also the first groove H1 disposed in the stator core 310, there is an advantage of forming the accommodation space greater than a chip accommodation space formed due to only the housing 400. In addition, since a thickness of the housing 400 may be secured, there is an advantage of improving robustness of the motor.

FIG. 10 is a view illustrating a motor according to an embodiment. In FIG. 10, an x direction may be a radial direction, and a y direction may be an axial direction. In addition, the axial direction and the radial direction may be perpendicular to each other. In this case, the axial direction may be a longitudinal direction of a shaft 1400. In addition, a reference numeral C may indicate a rotation center of the shaft 1400.

Referring to FIG. 10, a motor 11 or 11a according to the embodiment may include a housing 1100 or 1100a, a stator 1200 disposed in the housing 1100 or 1100a, a rotor 1300 disposed inside the stator 1200, a shaft 1400 coupled to the rotor 1300, a busbar 1500 disposed on the stator 1200, and a power terminal assembly 1600 or 1600a electrically connected to the busbar 1500. In this case, the term "inward" may refers to a direction in which the motor 11 or 11a is disposed toward a rotation center C1 in the radial direction, and the term "outward" may refer to a direction opposite to "inward."

In addition, the motor 11 or 11a may further include a cover (not shown) disposed to cover an opening formed at an upper side of the housing 1100 or 1100a. In this case, the housing 1100 or 1100a and the cover may form an exterior of the motor 11 or 11a.

A two-point coupling structure in which one side of the power terminal assembly 1600 or 1600a of the motor 11 or 11a is coupled to the housing 1100 or 1100a and the other side is coupled to the busbar 1500 in a fusing manner may be implemented. Accordingly, separation and movement of the power terminal assembly 1600 or 1600a can be prevented.

In this case, the power terminal assembly 1600 or 1600a may be coupled to the housing 1100 or 1100a without using a separate fastening member such as a bolt. For example, the coupling structure to which the housing 1100 or 1100a and the power terminal assembly 1600 or 1600a are coupled without using the separate fastening member may be formed. Accordingly, an assembly process of the motor 11 or 11a can be simplified to improve productivity.

Accordingly, in the motor 11 or 11a according to the embodiment, an example of the coupling structure formed so that the housing 1100 or 1100a and the power terminal assembly 1600 or 1600a are coupled is proposed, and thus the housing 1100 or 1100a may be assembled with the power terminal assembly 1600 or 1600a without using the fastening member such as the bolt.

FIG. 11 is a perspective view illustrating the motor illustrated in FIG. 10, and FIG. 12 is an exploded perspective view illustrating the motor illustrated in FIG. 10. FIG. 13 is a cross-sectional view along line A-A of FIG. 11, FIG. 14 is a perspective view illustrating the housing of the motor illustrated in FIG. 10, and FIG. 15 is a plan view illustrating the housing of the motor illustrated in FIG. 10. In this case, FIGS. 11 and 12 may be views illustrating the housing, the stator, the busbar, and the power terminal assembly in the motor illustrated in FIG. 10.

Referring to FIGS. 10 to 15, the motor 11 may include the housing 1100, the stator 1200 disposed in the housing 1100, the rotor 1300 disposed inside the stator 1200, the shaft 1400 coupled to the rotor 1300, the busbar 1500 disposed on the stator 1200, and the power terminal assembly 1600 electrically connected to the busbar 1500.

In this case, the power terminal assembly 1600 of the motor 11 may be slide-coupled to first grooves 1141 of the housing 1100 to prevent separation and movement.

The housing 1100 may be formed in a cylindrical shape in which an accommodation space is formed, and the opening may be formed at the upper side of the housing 1100. Accordingly, the stator 1200, the rotor 1300, the shaft 1400, the busbar 1500, and the like may be accommodated in the accommodation space of the housing 1100.

In addition, a shape or a material of the housing 1100 may be variously changed. For example, the housing 1100 may be formed of an aluminum or metal material which can endure well even at high temperatures.

The housing 1100 may include a first region 1110 formed in a cylindrical shape, a second region 1120 extending from an end portion of the first region 1110 in the radial direction, and a third region 1130 extending from an outer end portion of the second region 1120 in the axial direction. In addition, the housing 1100 may include a pair of first protrusions 1140 formed to protrude from the second region 1120 in the axial direction. In this case, the first region 1110, the second region 1120, the third region 1130, and the pair of first protrusions 1140 may be integrally formed.

The first region 1110 may be formed in a cylindrical shape. In addition, the stator 1200, the rotor 1300, the busbar 1500, and the like may be disposed inside the first region. In this case, an opening may be formed at an upper side of the first region 1110, and the stator 1200, the rotor 1300, the busbar 1500, and the like may be disposed in the first region 1110 through the opening.

In addition, the first region 1110 may include a pocket portion formed to accommodate a bearing B1 at a lower side. In this case, the pocket portion of the housing 1100 may be referred to as a housing pocket portion.

The second region 1120 may be formed to extend from the end portion of the first region 1110 in the radial direction. In addition, the third region 1130 extending from the outer end portion of the second region 1120 in the axial direction may be disposed.

In this case, based on the radial direction, a distance from the center C1 to the first region 1110 may be smaller than a distance from the center C1 to the third region 1130. Accordingly, the second region 1120 may include a stepped surface disposed between the first region 1110 and the third region 1130 and formed to allow the power terminal assembly 1600 to be seated.

An inner surface of the third region 1130 may be in contact with a body 1610 of the power terminal assembly 1600. Accordingly, the third region 1130 may support the body 1610 of the power terminal assembly 1600.

Meanwhile, the pair of first protrusions 1140 formed to fix the power terminal assembly 1600 may be disposed on an upper surface 1121 of the second region 1120.

The pair of first protrusions 1140 may be disposed on the second region 1120 to be spaced a predetermined gap G1 from each other. In this case, the first protrusions 1140 may be formed to protrude from the upper surface 1121 of the second region 1120 in the axial direction.

Accordingly, a part of the power terminal assembly 1600 may be disposed between the pair of first protrusions 1140, and the power terminal assembly 1600 may be guided by and inserted between the first protrusions 1140. Accordingly, with the third region 1130, the first protrusions 1140 may support the power terminal assembly 1600 to prevent movement of the power terminal assembly 1600.

In addition, based on a virtual line L1 connecting the center C1 and a center C11 between the pair of first protrusions 1140, one surfaces 1142 of the first protrusions 1140 disposed to face each other may be disposed parallel to the line L1. Accordingly, the first protrusions 1140 may horizontally guide sliding movement of the power terminal assembly 1600. In this case, a moving direction of the sliding movement may be a direction in which a center of the body 1610 of the power terminal assembly 1600 moves along the line L1.

In addition, each of the first protrusions 1140 may be formed in a bar shape when viewed in the axial direction.

Meanwhile, the first protrusion 1140 may include the first groove 1141 concavely formed in one direction.

The first groove 1141 may be concavely formed in an inner surface 1143 of the first protrusion 1140 in the moving direction. As illustrated in FIG. 14, the first groove 1141 may be formed by cutting a part of an edge side of the first protrusion 1140, but a position at which the first groove 1141 is formed is not necessarily limited thereto.

In addition, first protruding parts 1630 of the power terminal assembly 1600 may be slide-coupled to the first grooves 1141.

As illustrated in FIG. 13, when the first grooves 1141 and the first protruding parts 1630 are coupled, each of the first protruding parts 1630 may be disposed to overlap a part of one of the first protrusion 1140 in the axial direction. That is, a part of the first protrusion 1140 may be disposed on the first protruding part 1630. Accordingly, movement and separation of the power terminal assembly 1600 may be prevented through coupling between the first groove 1141 and the first protruding part 1630.

Referring to FIG. 10, the stator 1200 may include a stator core 1210, an insulator 1220 disposed on the stator core 1210, and coils 1230 wound around the insulator 1220.

The coils 1230 which generate a rotating magnetic field may be wound around the stator core 1210. In this case, the stator core 1210 may be formed as one core or formed by coupling a plurality of divided cores.

The stator core 1210 may be formed in a form in which a plurality of thin steel plates are stacked on each other but is not necessarily limited thereto. For example, the stator core 1210 may also be formed as one single part.

The stator core 1210 may include a yoke formed in a cylindrical shape and a plurality of teeth protruding from the yoke in the radial direction.

The plurality of teeth may be disposed apart from each other in a circumferential direction of the yoke. Accordingly, slots, which are spaces in which the coils 1230 are wound, may be formed between the teeth.

Meanwhile, the tooth of the stator 1200 may be formed to have an air gap between the tooth and the rotor 1300. In this case, the air gap may have a distance between the tooth and one of magnets 1320 in the radial direction.

The insulator 1220 insulates the stator core 1210 from the coils 1230. Accordingly, the insulator 1220 may be disposed between the stator core 1210 and the coils 1230.

Accordingly, the coils 1230 may be wound around the stator core 1210 on which the insulator 1220 is disposed.

The rotor 1300 rotates due to an electrical interaction with the stator 1200. In this case, the rotor 1300 may be rotatably disposed inside the stator 1200.

Referring to FIG. 10, the rotor 1300 may include a rotor core 1310 and the plurality of magnets 1320 disposed at an outer side of the rotor core 1310. In this case, the rotor 1300 may be formed as a surface permanent magnet (SPM) type rotor in which the magnets 1320 are attached to a surface of the rotor core 1310. In this case, the magnets 1320 may be disposed on the rotor core 1310 to be spaced a predetermined gap from each other in the circumferential direction based on a center C.

In addition, the rotor 1300 may further include a can which protects the rotor core 1310 and the magnets 1320. In this case, the can may be disposed to cover the rotor core 1310 to which the magnets 1320 are coupled.

The rotor core 1310 may be formed in a form in which a plurality of thin steel plates are stacked or in one cylindrical shape.

In addition, the rotor core 1310 may be formed in the cylindrical shape. In this case, a hole to which the shaft 1400 is coupled may be formed at the center C1 of the rotor core 1310.

The magnets 1320 generate a rotating magnetic field with the coils 1230 of the stator 1200. Accordingly, due to an electrical interaction between the coils 1230 and the magnets 1320, the rotor 1300 rotates, the shaft 1400 rotates in conjunction with the rotation of the rotor 1300, and thus a driving force of the motor 11 is generated. In this case, the magnets 1320 of the rotor 1300 may be referred to as drive magnets.

The plurality of magnets 1320 may be disposed apart from each other on an outer circumferential surface of the rotor core 1310 in the circumferential direction.

The shaft 1400 may be rotatably disposed in the housing 1100 using the bearing B1. In addition, the shaft 1400 may rotate in conjunction with the rotation of the rotor 1300. In this case, the shaft 1400 may be coupled to the hole formed at the center of the rotor core 1310 in a press-fitting manner.

The busbar 1500 may be disposed on the stator 1200. In addition, the busbar 1500 may electrically connect the stator 1200 and the power terminal assembly 1600 to allow external power to be applied to the stator 1200. For example, one side of the busbar 1500 may be electrically connected to each of the coils 1230 of the stator 1200, and the other side may be electrically connected to the power terminal assembly 1600.

The busbar 1500 may include a busbar body 1510 and a plurality of busbar terminals 1520 disposed in the busbar body 1510. In this case, the busbar terminals 1520 may be referred to as first terminals.

The busbar body 1510 may be a mold part formed in an injection molding manner. In this case, the busbar body 1510 may be formed of a synthetic resin material such as a resin. In this case, the busbar body 1510 may be formed in a ring shape. In addition, the busbar body 1510 may be referred as a first body.

The busbar terminals 1520 are disposed in the busbar body 1510, and a part of each of the busbar terminals 1520 may be disposed to be exposed from the busbar body 1510. In this case, the busbar terminal 1520 may be formed of a metal material.

Accordingly, the busbar terminal 1520 may include a coupling part 1521 coupled and electrically connected to the coil 1230 and a terminal part 1522 coupled and electrically connected to one of power terminals 1620 of the power terminal assembly 1600. In this case, the coupling part 1521 may be referred to as a first binding part or first coupling part.

The coupling part 1521 may be electrically connected to the coil 1230 in a fusing manner. For example, the coupling part 1521 may be formed to have a curved surface having a U-shaped cross section. In addition, an end portion of the coil 1230 may be disposed in the curved surface and electrically connected to the coupling part 1521 in the fusing manner. In this case, the curved surface may be referred to as a first curved surface.

Meanwhile, the coupling part 1521 may be disposed to protrude from an outer circumferential surface of the busbar body 1510 in the radial direction. Accordingly, the coupling part 1521 may be easily coupled to the end portion of the coil 1230 protruding in the axial direction.

The terminal part 1522 may be electrically connected to one side of the power terminal 1620. In this case, the terminal part 1522 may be formed in a plate shape having a flat surface. In addition, the terminal part 1522 may be referred to as a busbar terminal part or first terminal part.

Referring to FIGS. 11 and 12, the terminal part 1522 may be formed in a rectangular hexahedron shape having a rectangular cross section. Accordingly, the terminal part 1522 may secure a contact area to improve a fixing force with the power terminal 1620 in a fusing manner.

In addition, the terminal part 1522 may be disposed to protrude from an upper surface of the busbar body 1510 in the axial direction. In addition, when viewed in the axial direction, a direction in which the terminal part 1522 is disposed may be the same as a direction in which the power terminal assembly 1600 moves.

Referring to FIGS. 11 and 13, one side of the power terminal assembly 1600 may be slide-coupled to the housing 1100, and the other side may be slide-coupled to the busbar 1500 in the fusing manner. Accordingly, the power terminal assembly 1600 may be implemented as a two-point coupling structure to prevent separation and movement. In addition, the power terminal assembly 1600 may be electrically connected to an external power source.

FIG. 16 is a view illustrating the power terminal assembly of the motor illustrated in FIG. 10, and FIG. 17 is a view illustrating power terminals of the power terminal assembly disposed in the motor illustrated in FIG. 10.

Referring to FIGS. 16 and 17, the power terminal assembly 1600 may include the body 1610, the plurality of power terminals 1620, and the first protruding parts 1630 formed to protrude from the body 1610. In this case, the body 1610 and the first protruding part 1630 may be integrally formed. In addition, the power terminal 1620 may be electrically connected to the external power source through a connector or the like.

The body 1610 may be a mold part formed in an injection molding manner. In this case, the busbar body 1510 may be formed of a synthetic resin material such as a resin. Accordingly, the body 1610 may be formed of the material different from a material of the housing 1100 formed of a metal material, and the body 1610 may be insulated from the housing 1100. In this case, the body 1610 may be referred to as a power terminal body or second body.

The power terminal 1620 is disposed in the body 1610, and a part of the power terminal 1620 may be disposed to be exposed from the body 1610.

Accordingly, the power terminal 1620 may include a coupling part 1621 electrically connected to the terminal part 1522 of the busbar terminal 1520 and a terminal part 1622 electrically connected to the external power source. In this case, the coupling part 1621 may be referred to as a second binding part or second coupling part.

The coupling part 1621 may be electrically connected to the terminal part 1522 of the busbar terminal 1520 in a fusing manner. For example, the coupling part 1621 may be formed to have a curved surface having a U-shaped cross section. In addition, the terminal part 1522 of the busbar terminal 1520 may be disposed in the curved surface and electrically connected and coupled to the coupling part 1621 at the same time in the fusing manner. Accordingly, one side of the power terminal assembly 1600 may be fixed to the busbar 1500. In this case, the curved surface of the coupling part 1621 may be referred to as a second curved surface.

Meanwhile, the coupling part 1621 may be disposed under the body 1610 and may be formed by bending one region of the power terminal 1620 at least one time. In this case, the coupling part 1621 may be disposed to protrude inward from the body 1510.

The terminal part 1622 may be formed in a plate shape having a flat surface. In this case, the terminal part 1622 of the power terminal 1620 may be referred to as a power terminal part or second terminal part.

Referring to FIGS. 11 and 12, the terminal part 1622 may be formed in a rectangular hexahedron shape having a rectangular cross section. Accordingly, the terminal part 1622 may secure a contact area to improve a contact force and a fixing force with a connector.

In addition, the terminal part 1622 may be disposed to protrude from an upper surface of the body 1610 in the axial direction.

Meanwhile, three power terminals 1620 may be disposed in the body 1610 in an insert-injection molding manner. In addition, each of the three power terminals 1620 may be electrically connected to the busbar terminal 1520. In this case, the busbar terminal 1520 may be electrically connected to the coil 1230 of the stator 1200. Accordingly, one of the coils 1230 electrically connected to any one of the power terminals 1620 may implement at least one phase among a U-phase, a V-phase, and a W-phase.

The first protruding part 1630 may be formed to protrude from a side surface 1611 of the body 1610. In this case, the side surface 1611 of the body 1610 may be a surface guided by the first protrusion 1140 and disposed to face the first protrusion 1140.

In addition, the first protruding part 1630 is slide-coupled to the first groove 1141 to prevent separation and movement of the power terminal assembly 1600. In this case, due to the slide-coupling, a lower surface of the body 1610 may be in contact with the upper surface 1121 of the second region 1120.

In addition, the first protruding part 1630 may be formed to have a predetermined height which is slightly greater than or equal to a height of the first groove 1141 in the axial direction based on the upper surface 1121 of the second region 1120. Accordingly, since the first protruding part 1630 is slide-coupled to the first groove 1141 in an engagement manner, the fixedness of the power terminal assembly 1600 can be improved.

Meanwhile, an upper surface of the first protruding part 1630 may be a curved surface 1631. For example, a surface of an upper portion of the first protruding part 1630 may be rounded to form the curved surface 1631. In this case, the curved surface 1631 of the first protruding part 1630 may be referred to as a third curved surface.

Accordingly, the first protruding part 1630 may be easily horizontally slide-coupled to the first groove 1141 using the curved surface 1631 in the engagement manner. In this case, the first protruding part 1630 may be in line contact with the first protrusion 1140 in the first groove 1141 using the curved surface 1631.

FIG. 18 is a perspective view illustrating a motor according to still another embodiment, and FIG. 19 is an exploded perspective view illustrating the motor illustrated in FIG. 18. FIG. 20 is a cross-sectional view along line B-B of FIG. 18, and FIG. 21 is a perspective view illustrating a housing of the motor illustrated in FIG. 18. FIG. 22 is a plan view illustrating the housing of the motor illustrated in FIG. 18, and FIG. 23 is a view illustrating a power terminal assembly of the motor illustrated in FIG. 18.

When a motor 11a is described with referenced to FIGS. 18 to 2223, components which are the same as those of the motor 11 according to the first embodiment may be assigned with the same reference numerals, and thus the specific description thereof will be omitted.

Comparing the motor 11 according to the previous embodiment and the motor 11a according to the present embodiment, the motor 11a is different from the motor 11 according to the previous embodiment in that one regions of first protrusions 1140a of the motor 11a are caulked to fix a power terminal assembly 1600a. In this case, the first protrusions 1140a of the motor 11a according to the present embodiment may be the first protrusions 1140 of the motor 11 of the previous embodiment in which the first grooves 1141 are removed.

That is, the motor 11a according to the present embodiment is different from the motor 11 according to the previous embodiment in that a coupling structure in which the power terminal assembly 1600a is fixed by caulking parts 1150 formed by caulking one regions of the first protrusions 1140a instead of the slide-coupling between the first grooves 1141 and the first protruding parts 1630 of the motor 11 according to the previous embodiment.

Referring to FIGS. 10 and 18 to 23, the motor 11a may include a housing 1100a, a stator 1200 disposed in the housing 1100a, a rotor 1300 disposed inside the stator 1200, a shaft 1400 coupled to the rotor 1300, a busbar 1500 disposed on the stator 1200, and the power terminal assembly 1600a electrically connected to the busbar 1500.

In this case, separation and movement of the power terminal assembly 1600a can be prevented by the caulking part 1150.

The housing 1100a may include a first region 1110, a second region 1120, a third region 1130, and a pair of first protrusions 1140a and the caulking parts 1150 formed on the second region 1120.

The pair of first protrusions 1140a may be disposed in the second region 1120 to be spaced a predetermined gap G1 from each other in one direction.

In addition, the pair of first protrusions 1140a may guide assembly of the power terminal assembly 1600a coupled in an axial direction. Accordingly, since a part of the power terminal assembly 1600a may be disposed between the pair of first protrusions 1140a, the pair of first protrusions 1140a may support the power terminal assembly 1600a to prevent movement of the power terminal assembly 1600a. In this case, the power terminal assembly 1600a may be coupled between the pair of first protrusions 1140a in an engagement manner.

As illustrated in FIG. 20, based on an upper surface 1121 of the second region 1120, each of the first protrusion 1140a may be formed in the second region 1120 so that a height H11 of the first protrusion 1140a is greater than a height H21 of a body 1610.

Accordingly, based on the upper surface 1121 of the second region 1120, since the first protrusion 1140a is formed at a higher level than the body 1610, as illustrated in FIG. 18, each of the caulking parts 1150 may press an upper surface 1612 of the body 1610 of the power terminal assembly 1600a to prevent the movement of the power terminal assembly 1600a.

In this case, the caulking part 1150 may be formed by caulking one region of the first protrusion 1140a. Accordingly, in the motor 11a, the coupling structure between the housing 1100a and the power terminal assembly 1600a can be implemented using the caulking part 1150.

For example, in a state in which the power terminal assembly 1600a is disposed between the pair of first protrusions 1140a, the caulking parts 1150 may be formed by pressing one regions of the first protrusions 1140a. Accordingly, the caulking parts 1150 may be in contact with the body 1610 of the power terminal assembly 1600a to overlap the body 1610 in the axial direction so as to prevent the movement of the power terminal assembly 1600a.

Meanwhile, the housing 1100a may further include second grooves 1160 concavely formed in the upper surface 1121 in the axial direction. In this case, the second grooves 1160 may be formed between the pair of first protrusions 1140a.

In addition, second protruding parts 1640 of the power terminal assembly 1600a may be coupled to the second grooves 1160. Accordingly, due to the coupling between the second grooves 1160 and the second protruding parts 1640, the movement of the power terminal assembly 1600a can be prevented.

In addition, the housing 1100a may further include a second protrusion 1170 formed to protrude from the upper surface 1121.

With the first protrusions 1140a, the second protrusion 1170 may guide coupling of the power terminal assembly 1600a and serve to check the authenticity of the power terminal assembly 1600a at the same time.

As illustrated in FIG. 19, the second protrusion 1170 may be formed to connect outer end portions of the pair of first protrusions 1140a, and an outer surface which is one side of the body 1610 may be in contact with an inner side 1171 of the second protrusion 1170 to be supported by the second protrusion 1170.

Referring to FIG. 23, the power terminal assembly 1600a may include the body 1610, a plurality of power terminals 1620, and the second protruding parts 1640 formed to protrude from the body 1610. In this case, the body 1610 and the second protruding parts 1640 may be integrally formed.

The second protruding parts 1640 may be formed to protrude from a lower surface of the body 1610 in the axial direction. In addition, the second protruding parts 1640 may be coupled to the second grooves 1160 of the housing 1100a in an engagement manner to prevent separation and movement of the power terminal assembly 1600a.

The embodiments can be used in various devices for vehicles, home appliances, or the like.

The invention claimed is:

1. A motor comprising:
a housing;
a stator disposed in the housing;
a rotor disposed inside the stator; and
a shaft coupled to the rotor,
wherein the stator includes a stator core in contact with the housing,
wherein the stator core includes a first region and a second region having different outer diameters,
wherein the housing includes a third region and a fourth region having different inner diameters,
wherein the outer diameter of the first region is smaller than the outer diameter of the second region,
wherein the inner diameter of the third region is greater than the inner diameter of the fourth region,
wherein the first region and the third region are disposed to overlap in a radial direction of the shaft,
wherein the housing further include a fifth region,
wherein an inner diameter of the fifth region is smaller than the inner diameter of the fourth region,
wherein the third region is disposed between the fourth region and the fifth region in the axial direction, and
wherein the fifth region and the third region form a step, the step being in contact with the bottom surface of the stator core.

2. The motor of claim 1, wherein the first region is disposed to overlap the fifth region in an axial direction of the shaft.

3. The motor of claim 1, wherein the third region includes a 3-1 region of which an inner diameter increases, and
wherein the 3-1 region is connected to the fourth region.

4. The motor of claim 3, wherein a part of the 3-1 region is disposed to form the overlap region with the second region.

5. The motor of claim 1, wherein the stator core includes a first groove formed in an outer surface in a concave shape,
wherein the housing includes a second groove formed in an inner surface in a concave shape, and
wherein the first groove and the second groove are disposed to overlap in a radial direction of the shaft.

6. The motor of claim 1, wherein the power terminal assembly includes a body, a plurality of power terminals disposed in the body, and first protruding parts formed to protrude from the body, and
wherein the first protruding parts are slide-coupled to first grooves concavely formed in the first protrusions.

7. The motor of claim 1, wherein the power terminal assembly includes a body and a plurality of power terminals disposed in the body, and
wherein the housing further includes a caulking part, which is formed by caulking one region of each of the first protrusions and is in contact with an upper surface of the body.

8. A motor comprising:
a housing;
a stator disposed in the housing;
a rotor disposed to correspond to the stator;
a shaft coupled to the rotor;
a busbar disposed on the stator; and
a power terminal assembly coupled to the housing,
wherein the housing includes a first region in which an opening is formed in an upper portion and the stator and the rotor are disposed, a second region extending from an end portion of the first region in a radial direction, and a pair of first protrusions formed on the second region to protrude in an axial direction,
wherein the power terminal assembly is guided by the first protrusions and disposed between the first protrusions,
wherein the housing include a third region extending from an outer end portion of the second region in the axial direction, and
wherein the second region include a stepped surface disposed between the first region and the third region and formed to allow the power terminal assembly to be seated.

9. The motor of claim 8, wherein the housing includes first grooves formed in the first protrusions,
  wherein the power terminal assembly includes a body, a plurality of power terminals disposed in the body, and first protruding parts formed to protrude from the body,
  wherein the body and the first protruding parts are integrally formed, and
  wherein the first protruding parts are coupled to the first grooves.

10. The motor of claim 9, wherein the first grooves are concavely formed in inner surfaces of the first protrusions, and
  wherein the first protruding parts are slide-coupled to the first grooves.

\* \* \* \* \*